United States Patent [19]

Otsuka et al.

[11] Patent Number: 5,858,899

[45] Date of Patent: Jan. 12, 1999

[54] ALUMINUM OXIDE BASED SINTERED BODY

[75] Inventors: Jun Otsuka; Satoshi Iio; Yo Tajima, all of Nagoya, Japan

[73] Assignee: NGK Spark Plug Co., Ltd., Aichi, Japan

[21] Appl. No.: 901,081

[22] Filed: Jul. 28, 1997

Related U.S. Application Data

[60] Continuation of Ser. No. 568,807, Dec. 7, 1995, abandoned, which is a division of Ser. No. 417,027, Apr. 5, 1995, Pat. No. 5,527,746, which is a continuation-in-part of Ser. No. 311,580, Sep. 23, 1994, abandoned.

[30] Foreign Application Priority Data

Sep. 24, 1993 [JP] Japan .................................. 5-261921

[51] Int. Cl.⁶ .................................................. C04B 35/117
[52] U.S. Cl. .............................. 501/127; 501/89; 501/91; 501/92; 501/128
[58] Field of Search ................................. 501/89, 91, 92, 501/127, 128

[56] References Cited

U.S. PATENT DOCUMENTS

| | | | |
|---|---|---|---|
| 4,729,972 | 3/1988 | Kodama et al. ........................... | 501/91 |
| 5,108,963 | 4/1992 | Fu et al. .................................... | 501/89 |
| 5,123,935 | 6/1992 | Kanamaru et al. ....................... | 501/89 |
| 5,286,684 | 2/1994 | Otsuka et al. ............................ | 501/89 |
| 5,322,823 | 6/1994 | Ueda et al. ............................... | 501/89 |

FOREIGN PATENT DOCUMENTS

| | | |
|---|---|---|
| 52-104515 | 9/1977 | Japan . |
| 62-59567 | 3/1987 | Japan . |
| 63-129061 | 6/1988 | Japan . |

*Primary Examiner*—Karl Group
*Attorney, Agent, or Firm*—Sughrue, Mion, Zinn, Macpeak & Seas, PLLC

[57] ABSTRACT

An aluminum oxide based sintered body and a method for manufacturing the same are disclosed. The aluminum oxide based sintered body is composed of silicon compounds in particulate form of from about 5 to about 40 mole %, calculated as a carbide, which is present along grain boundaries as a silicon-containing glass, at least one metal or metal compound of from 0.5 to about 20 mole %, calculated as metals, selected from Ti, Nb, Ta, Cr and Mo, and the remainder of $Al_2O_3$, and the molar ratio of the metals with respect to the silicon compounds, calculated as a carbide, is about 4 or less.

2 Claims, No Drawings

ALUMINUM OXIDE BASED SINTERED BODY

This is a continuation of application Ser. No. 08/568,807 filed Dec. 7, 1995 abandoned, which is a divisional of application Ser. No.08/417,027 filed Apr. 5, 1995 (now U.S. Pat. No. 5,527,746), which is a continuation-in-part of application Ser. No. 08/311,580 filed Sep. 23, 1994 (abandoned).

FIELD OF THE INVENTION

The present invention relates to an aluminum oxide based sintered body and a method for manufacturing the same. The aluminum oxide sintered body is suitably used for a material required having wear resisting properties, such as various materials for use in mechanical tools, sliding parts etc.

BACKGROUND OF THE INVENTION

It is well known in the arts that aluminum oxide ceramics may be prepared in relatively low cost and have excellent properties, particularly, in terms of mechanical strength and heat resistance. Accordingly, aluminum oxide has been widely used for in various applications.

As one of the practical applications of the aluminum oxide for mechanical purposes, a part in a machine required having highly wear resistance, for example, materials for tools, sliding parts, etc., has been sintered. However, since the requirements for each application have become more severe, materials capable of attaining higher performance are further demanded. In particular, the materials having high wear resistance are desired.

To comply with such requirements, attempts have been made to improve in wear resistance by adding various carbides into the aluminum oxide.

Materials made of aluminum oxide in which various carbides are simply added generally show large crystal grains, and not satisfy the above-noted severe requirements since the dislodgement of grains from the sintered material is liable to be caused when such material is subjected to abrasion. Therefore, these materials cannot be accepted as having sufficient wear resistance.

Also, aluminum oxide materials containing carbides has drawbacks in that if the carbide is present in an amount of less than 5 wt %, the material shows insufficient wear resistance; on the other hand, the more the amount of carbides is present, the lower the mechanical strength, depending on the carbides, becomes.

The reason for the above phenomenon is not clear so far; however, it is considered to be related to the fact that interfacial bonding between the aluminum oxide grains and various carbides grains is weak, and that the aluminum oxide grains are not sufficiently pulverized.

For instances, JP-A-62-59567 (a term "JP-A" used herein means unexamined Japanese patent publication) discloses a ceramic material having excellent wear resistance which principally comprises 5 to 20 weight % of titanium carbide and the rest of alumina. Since the titanium carbide, per se, is added as one of the starting materials, the effect according to the present invention in terms of the wear resistance cannot be attained.

JP-A-52-104515 and JP-A-63-129061 disclose preparation of alumina/titanium carbide ceramic material in which titanium carbide is formed by chemical reaction in a firing step; however, no third component, which is required as an indispensable component to fulfill the objects according to the present invention, is present in the composition. Accordingly, the product obtained by the chemical reaction step in these references cannot form pulverized grain of the present invention.

SUMMARY OF THE INVENTION

According to the present invention in which the foregoing drawbacks are overcome, there is provided an aluminum oxide based sintered body having excellent properties in terms of mechanical strength and wear resistance, as well as a method for producing the same.

A first object of the present invention is attained by providing an aluminum oxide based sintered body which comprises from about 5 to about 40 mole % of silicon, calculated as a carbide, from about 0.5 to about 25 mole % of at least one metal or metal compound, selected from Ti, Ta, Cr and Mo, calculated as metals, and the remainder of $Al_2O_3$, and a molar ratio of the metals with respect to the silicon compounds, calculated as a carbide, is about 4 or less.

A second object of the present invention is attained by providing an aluminum oxide based sintered body which comprises from about 5 to about 40 mole % of silicon, calculated as a carbide, from about 0.5 to about 25 mole % of at least one metal or metal oxide selected from Ti, Nb, Ta, Cr and Mo, calculated as metals and the remainder of $Al_2O_3$, a molar ratio of the metals with respect to the silicon compounds, calculated as a carbide, is about 4 or less, and the carbides or silicides of said metals having an average particle size of about 1 μm or less are dispersed therein.

A preferable method for producing the aluminum oxide based sintered body comprises firing a powder mixture at a temperature of from about 1500° to about 1900° C. under a non-oxidizing atmosphere, wherein the powder mixture comprises from about 5 to about 40 mole % of silicon carbide in particulate form, from about 0.5 to about 25 mole % of at least one metal selected from Ti, Nb, Ta, Cr and Mo and the remainder of $\alpha$-$Al_2O_3$ sources, calculated as $\alpha$-$Al_2O_3$, and the molar ratio of the metals with respect to the silicon carbide is about 4 or less, to form and disperse carbides or suicides of said metals having an average particle size of about 1 μm or less therein.

In the method of the present invention for producing the sintered body, a treatment according to a hot isostatic press (hereinafter referred to simply as HIP) may be applied after a firing process.

The references herein to the molar ratio of the metals with respect to the silicon compounds, calculated as a carbide, means the ratio of the moles of metals contained in the sintered body, such as Ti, Nb, etc., with respect to the moles of silicon contained also in the sintered body. In the case where the metal compounds are used, said mole % is calculated as metals. References herein to compounds being in particulate form means that the particles are generally round in shape, and are not fragments referred to as "whiskers" or "acicular particles".

DETAILED DESCRIPTION OF THE INVENTION

The $\alpha$-$Al_2O_3$ sources used in the present invention includes $\alpha$-$Al_2O_3$ and any raw material which is capable of being converted to $\alpha$-$Al_2O_3$ by firing thereof at a temperature of from about 1500° to about 1900° C. under a non-oxidizing atmosphere, for example, $\gamma$-$Al_2O_3$ or boehmite.

Mixing the powder mixture comprising silicon carbide, metals and $\alpha$-$Al_2O_3$ sources may be carried out in a conventional manner, such as in a wet-type ball-mill. The powder mixture, thus prepared may be molded on demand, followed by firing thereof under a non-oxidized atmosphere, such as, for example, under an argon gas or nitrogen gas atmosphere. The firing process may be carried out according to a conventional method. i.e., either a pressurized firing or non-pressurized firing.

In the aluminum oxide based sintered body according to the present invention, the metals added are carbonized or silicified in the firing process to form fine particles having an average particle size (diameter) of about 1 μm or less. The metal carbide particles or metal silicides particles, thus formed, are dispersed in the sintered body, resulting in grain fineness due to suppressed grain growth of aluminum oxide. The fine aluminum oxide grains and metal carbides having wear resistance are synergistically affected to improve wear resistance of the sintered body. The metal suicides provide an improvement in wear resistance of the sintered body to the same general extent as the metal carbides. The metal carbides and the suicides can be selectively formed depending on a starting composition in wide range.

However, it is noted that not the whole amount of the silicon carbide and metals are reacted with each other, and a silicon-containing glass sometimes may be by-produced, or unreacted metals may remain. The silicon-containing glass mentioned above is present along grain boundaries, and enhances interfacial bonding strength between aluminum oxide and metal carbides particles or silicides particles due to intimate bonding therebetween. Thus, the silicon-containing glass is considered to be an important feature of the present claimed invention.

On the other hand, unreacted metals show advantages such as improving thermal conductivity without adversely affecting on the strength and wear resistance.

Accordingly, depending on a purpose, the raw material is not always reacted as a whole, but may partially remain in a non-reacted state. The ratio of the reacted and unreacted materials in product may be controlled according to the composition of the starting material and the firing temperature.

According to the method of the present invention, silicon carbide in a raw material is converted to provide a carbon source for metal carbides and a silicon source for metal silicides. Since in the silicon carbide, carbon atoms and silicon atoms are uniformly disposed at an atomic level, a product composition in which both carbides and silicides are formed contains metal carbides and metal silicides which are uniformly dispersed inherently.

Accordingly, metal carbides or metal silicides particles, which are finer than silicon carbide particles and metals particles, are formed during a firing process, thereby leading pulverization of aluminum oxide grains existed on grain boundaries or within grains in the sintered body. Thus, the sintered body having high strength and excellent wear resistance is obtained.

According to the present invention, since super fine particles are not required as a raw material, production cost may be suppressed to a low level.

In the case where the silicon carbide is contained in an amount lower than about 5 mole %, the amount of the metals added is less than about 0.5 mole %, or the molar ratio of the metals with respect to the silicon carbide is over about 4, a sufficient amount of metal carbides or metal suicides for enhancing wear resistance and strength are not formed.

On the other hand, if the amount of the silicon carbide added is over about 40 mole %, the sinterability may be deteriorated, and when an amount of the metal added is over about 25 mole %, segregation is liable to be caused, thereby resulting in lowered wear resistance.

According to the present invention, aluminum oxide is pulverized by adding silicon carbide and specific metals into a starting material, and an excellent aluminum oxide based sintered body having 700 MPa or higher of mechanical strength and excellent wear resistance is economically obtained by incorporation a silicon-containing glass along grain boundaries.

The present invention is hereinafter described in greater detail with reference to examples, which are not to be construed as limiting the scope thereof. Unless otherwise indicated, all parts, percents and ratios are by mole.

EXAMPLE 1

A powder mixture containing $\gamma$-$Al_2O_3$ which has 99% purity and an average particle size of 1 μm and contains small amounts of AlOOH and $Al(OH)_3$, SiC, which is of $\beta$-type and have an average particle size of 0.3 μm, Ti having through #400 mesh Standard Sieve, Cr, Nb and Ta having through #350 mesh Standard Sieve and Mo having an average particle size of 0.65 μm, and ethanol were charged into a wet-type ball mill in each amount stated in Table 1 below.

After mixing, the mixture was molded with a hot-press of 40 MPa pressure at a temperature mentioned in Table 1, to form Samples 1 to 25.

For comparison, Sample 26 was formed by the same method as Sample 1, except that no metals and no silicon carbide were added.

TABLE 1

| Samples | Metal Added | Starting Composition (mol %) | | | Ratio Metal/SiC | Temperature (°C.) | Remarks |
|---|---|---|---|---|---|---|---|
| | | $\alpha$-$Al_2O_3$ | SiC | Metal | | | |
| 1 | Ti | 75.0 | 13.0 | 12.0 | 0.92 | 1500 | Invention |
| 2 | Ti | 75.0 | 10.0 | 15.0 | 1.50 | 1500 | " |
| 3 | Ti | 73.0 | 6.0 | 21.0 | 3.50 | 1500 | " |
| 4 | Nb | 75.0 | 13.0 | 12.0 | 0.92 | 1500 | " |
| 5 | Nb | 75.0 | 10.0 | 15.0 | 1.50 | 1500 | " |
| 6 | Nb | 73.0 | 6.0 | 21.0 | 3.50 | 1500 | " |
| 7 | Ta | 75.0 | 13.0 | 12.0 | 0.92 | 1500 | " |
| 8 | Ta | 75.0 | 10.0 | 15.0 | 1.50 | 1500 | " |
| 9 | Cr | 75.0 | 13.0 | 12.0 | 0.92 | 1500 | " |
| 10 | Cr | 75.0 | 10.0 | 15.0 | 1.50 | 1500 | " |
| 11 | Mo | 90.0 | 8.0 | 2.0 | 0.25 | 1500 | " |
| 12 | Mo | 90.0 | 5.0 | 5.0 | 1.00 | 1500 | " |
| 13 | Mo | 75.0 | 24.0 | 1.0 | 0.04 | 1700 | " |
| 14 | Mo | 75.0 | 13.0 | 12.0 | 0.92 | 1500 | " |
| 15 | Mo | 75.0 | 10.0 | 15.0 | 1.50 | 1500 | " |
| 16 | Mo | 73.0 | 6.0 | 21.0 | 3.50 | 1500 | " |
| 17 | Ti | 40.0 | 30.0 | 30.0 | 1.00 | 1600 | Comparison |
| 18 | Ti | 75.0 | 4.5 | 20.5 | 4.56 | 1500 | " |
| 19 | Nb | 40.0 | 30.0 | 30.0 | 1.00 | 1600 | " |
| 20 | Nb | 75.0 | 4.5 | 20.5 | 4.56 | 1500 | " |
| 21 | Ta | 75.0 | 4.5 | 20.5 | 4.56 | 1500 | " |
| 22 | Cr | 75.0 | 4.5 | 20.5 | 4.56 | 4500 | " |
| 23 | Mo | 40.0 | 30.0 | 30.0 | 1.00 | 1600 | " |
| 24 | Mo | 75.0 | 4.5 | 20.5 | 4.56 | 1500 | " |
| 25 | Mo | 96.7 | 3.0 | 0.3 | 0.10 | 1400 | " |
| 26 | — | 100.0 | — | — | — | 1300 | " |

Among the sintered samples, Samples 1, 4, 7, 9 and 14 according to the claimed invention were evaluated by X-ray diffraction method to identify the crystal phases.

The results are shown in Table 2.

TABLE 2

| Sample | Crystal Phases in Sintered Body |
|---|---|
| 1 | α-$Al_2O_3$, TiC, β-SiC |
| 4 | α-$Al_2O_3$, NbC, $Nb_5Si_3$, β-SiC |
| 7 | α-$Al_2O_3$, TaC, β-SiC |
| 9 | α-$Al_2O_3$, $Cr_3C_2$, β-SiC |
| 14 | α-$Al_2O_3$, $Mo_2C$, $Mo_5Si_3$, β-SiC |

As clearly seen from the Table 2, γ-$Al_2O_3$ in the starting material was completely converted to α-$Al_2O_3$. In each sintered body, a carbide of the metal added and silicon carbide were recognized. Further, in a part of the sintered body a silicide was found to be produced in addition to the carbides, wherein a glass phase was present along grain boundaries in the sintered body. According to a chemical analysis it was found that the glass phase contained silicon atoms.

The microstructure of each sintered body was observed with transmission electron microscopy, and it was found that fine carbide particles having an average particle size of 0.5 μm or less were scattered, as well as α-$Al_2O_3$ particles having an average particle size of 2 μm or less, and β-SiC particles having an average particle size of about 0.1 μm.

Each sintered body was also evaluated in terms of density, mechanical strength, fracture toughness and wear resistance.

The mechanical strength was evaluated by a three-point bending test according to JIS R 1601, and the fracture toughness by IF method JIS R 1607, under a load of 30 kg.f. In the fracture toughness test, a Vickers hardness was also measured.

The wear resistance was evaluated in a manner that a carbon steel ring having outside and inside diameters of 25 mm and 20 mm, respectively, was press-fitted on a surface of the sintered body disc under a load of 300 kg.f, which had a mirror-like-surface. The sintered body disc, thus prepared, was immersed into an oil bath and the disc was rotated at a rate of 500 r.p.m. for 5 hours.

Roughness of the disc surface before and after testing was measured and the difference between the before and after testing was evaluated as wear resistance in terms of maximum roughness height Rmax. The results are shown in Table 3 below.

TABLE 3

| Sample | Density*1 (g/cm³) | Strength (Mpa) | Fracture Toughness (Mpa · m^{0.5}) | Hardness HV30 | Surface Roughness*2 (μm) Before | After | Results | Remarks |
|---|---|---|---|---|---|---|---|---|
| 1 | 3.92 | 740 | 2.5 | 16.3 | 0.16 | 0.19 | ○ | Invention |
| 2 | 3.95 | 700 | 2.4 | 16.1 | 0.15 | 0.20 | ○ | " |
| 3 | 3.97 | 720 | 2.6 | 15.8 | 0.12 | 0.21 | ○ | " |
| 4 | 4.05 | 870 | 2.5 | 16.8 | 0.08 | 0.10 | ○ | " |
| 5 | 4.14 | 810 | 2.7 | 16.4 | 0.11 | 0.14 | ○ | " |
| 6 | 4.29 | 760 | 2.6 | 16.1 | 0.16 | 0.22 | ○ | " |
| 7 | 4.42 | 840 | 3.2 | 15.9 | 0.13 | 0.19 | ○ | " |
| 8 | 4.63 | 790 | 2.7 | 15.7 | 0.15 | 0.24 | ○ | " |
| 9 | 3.95 | 780 | 2.6 | 17.8 | 0.17 | 0.22 | ○ | " |
| 10 | 4.00 | 730 | 2.5 | 17.4 | 0.09 | 0.16 | ○ | " |
| 11 | 3.97 | 830 | 2.6 | 17.3 | 0.11 | 0.13 | ○ | " |
| 12 | 4.03 | 750 | 2.6 | 16.9 | 0.12 | 0.14 | ○ | " |
| 13 | 3.87 | 940 | 2.7 | 18.5 | 0.14 | 0.15 | ○ | " |
| 14 | 4.15 | 800 | 2.5 | 17.5 | 0.11 | 0.11 | ○ | " |
| 15 | 4.25 | 760 | 2.6 | 16.6 | 0.14 | 0.15 | ○ | " |
| 16 | 4.43 | 710 | 3.4 | 16.3 | 0.13 | 0.15 | ○ | " |
| 17 | 3.86 | 590 | 3.4 | 16.2 | 0.15 | 0.41 | Δ | Comparison |
| 18 | 3.96 | 630 | 2.6 | 15.7 | 0.18 | 0.63 | x | " |
| 19 | 4.45 | 620 | 3.3 | 16.5 | 0.16 | 0.34 | Δ | " |
| 20 | 4.21 | 670 | 2.5 | 16.0 | 0.20 | 0.69 | x | " |
| 21 | 4.84 | 650 | 2.6 | 15.6 | 0.19 | 0.92 | x | " |
| 22 | 4.03 | 620 | 2.5 | 17.0 | 0.13 | 0.74 | x | " |
| 23 | 4.70 | 640 | 3.3 | 17.4 | 0.11 | 0.26 | Δ | " |
| 24 | 4.37 | 660 | 2.6 | 16.1 | 0.16 | 0.58 | x | " |
| 25 | 3.95 | 720 | 2.4 | 17.9 | 0.19 | 0.84 | x | " |
| 26 | 3.95 | 640 | 2.3 | 17,.0 | 0.24 | 1.40 | x | " |

Note
*1Samples are sufficiently densified.
*2Results of the surface roughness are based on the following criteria.
○: Surface roughness after testing is double or less with respect to before testing
Δ: Surface roughness after testing is three times to double,
x: Surface roughness after testing is over three times.

As seen from the results of Table 3, the sintered body according to the present invention is sufficiently densified, shows strength of 700 Mpa or over, and shows excellent wear resistance.

In contrast, the sintered body which is out of the scope of the claimed invention is inferior to those of the present invention, even though the sintered body is sufficiently densified.

Samples 17, 19 and 23, in which metal contents are over 25% and Samples 18, 20, 21, 22 and 24, in which silicon carbide contents are not more than 5% and metal/SiC ratios are 4 or more, and Sample 25, in which amounts of silicon carbide and a metal are not reached to the claimed amounts, are inferior in terms of the wear resistance.

Example 2

α-$Al_2O_3$ powder of 99.99% or higher in purity, and an average particle size of 0.2 μm, β-SiC powder having an average particle size of 0.3 μm, and Mo powder having an average particle size of 0.65 μm were mixed in methanol as a solvent in a wet type ball mill in each amount stated in Table 4, and the mixture was molded under a cold isostatic hydraulic pressure (CIP).

The molded product was fired at a temperature ed in Table 4 in an ordinary argon gas atmosphere under an atmospheric pressure and further treated with a hot isostatic press (HIP) under an argon gas pressure of 2000 atm to form sintered body Samples 27 to 30.

TABLE 4

| Sample | Metal Added | Starting Composition (mol %) α-Al$_2$O$_3$ | SiC | Metal | Metal/SiC Ratio | Firing Temperature (°C.) | HIP Temp. (°C.) |
|---|---|---|---|---|---|---|---|
| 27 | Mo | 90.0 | 5.0 | 5.0 | 1.00 | 1600 | 1500 |
| 28 | Mo | 75.0 | 13.0 | 12.0 | 0.92 | 1800 | 1500 |
| 29 | Mo | 75.0 | 5.0 | 20.0 | 4.00 | 1700 | 1600 |
| 30 | Mo | 60.0 | 20.0 | 20.0 | 1.00 | 1900 | 1500 |

The sintered body obtained was evaluated in the manner as of Example 1. The results are shown in table 5.

The results of the sintered body show excellent properties at the same level as those of the Example 1 particularly at high wear resistance level.

TABLE 5

| Sample | Density (g/cm$^3$) | Strength (Mpa) | Fracture Toughness (Mpa · m$^{0.5}$) | Hardness HV30 |
|---|---|---|---|---|
| 27 | 4.10 | 740 | 2.6 | 1930 |
| 28 | 4.26 | 760 | 2.8 | 1950 |
| 29 | 4.52 | 730 | 2.7 | 1780 |
| 30 | 4.49 | 700 | 3.2 | 1800 |

While the invention has been described in detail and with reference to specific embodiments thereof, it will be apparent to one skilled in the art that various changes and modifications can be made therein without departing from the spirits and scope thereof.

What is claimed is:

1. An aluminum oxide based sintered body produced by firing a powder mixture comprising silicon carbide, said silicon carbide being in the form of particles generally round, which comprises:

i) silicon compounds in an amount of from about 5 to about 40 mole %, calculated as a carbide, wherein said silicon compounds comprise unreacted silicon carbide and silicon-containing glass, said silicon-containing glass being present alone grain boundaries;

ii) at least one metal or metal compound of from about 0.5 to about 25 mole %, calculated as metals, selected from Ti, Nb, Tb, Ta, Cr and Mo, wherein said at least one metal or metal compound comprises metal carbide; and iii) the remainder of Al$_2$O$_3$, wherein the molar ratio of the at least one metal with respect to said silicon compounds, calculated as a carbide, is about 4 or less, and wherein the at least one metal carbide has an average particle size of about 1 μm or less and is dispersed in the aluminum oxide based sintered body.

2. An aluminum oxide based sintered body as in claim 1, further comprising a metal silicide of said at least one metal, wherein the metal silicide has an average particle size of about 1 μm or less, and is dispersed in the aluminum oxide based sintered body.

* * * * *

UNITED STATES PATENT AND TRADEMARK OFFICE
CERTIFICATE OF CORRECTION

PATENT NO.    : 5,858,899
DATED         : January 12, 1999
INVENTOR(S)   : Jun OTSUKA et al It is certified that error(s) appears in the above-identified patent and that said Letters Patent is hereby corrected as shown below:

At column 8, line 17, (line 9 of claim1) please correct "alone" to --along--.

Signed and Sealed this

Eleventh Day of May, 1999

Attest:

Attesting Officer

Q. TODD DICKINSON

Acting Commissioner of Patents and Trademarks